Jan. 26, 1965  R. A. RENAUD  3,167,699

PROTECTIVE CONTROL CIRCUIT

Filed Aug. 10, 1962

Robert A. Renaud,
Inventor.
Koenig, Pope, Senniger and Powers,
Attorneys.

United States Patent Office 3,167,699
Patented Jan. 26, 1965

3,167,699
PROTECTIVE CONTROL CIRCUIT
Robert A. Renaud, Corpus Christi, Tex., assignor to Texas Instruments Incorporated, Dallas, Tex., a corporation of Delaware
Filed Aug. 10, 1962, Ser. No. 216,145
5 Claims. (Cl. 318—221)

This invention relates to protective control circuits, and with regard to certain more specific features, to protective circuits for electric motors having main and start windings and operating on A.C. current, and to comparable apparatus operative on current of a pulsing nature.

Among the several objects of the invention may be noted the provision of a protective circuit for an A.C. motor in connection with which a heater type of thermostatic switch and a starting switch are employed, being so arranged that the thermostatic switch will not, as was possible heretofore, trip to open position under certain safe operating conditions of the motor; and the provision of a circuit of the class described which at low cost is simple to construct. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which several of various possible embodiments of the invention are illustrated, FIG. 1 is a circuit digram illustrating an example of a prior circuit upon which the circuit of the invention is an improvement;

Corresponding reference characters indicate corresponding parts throughout the several views of the drawings.

Figure 1:
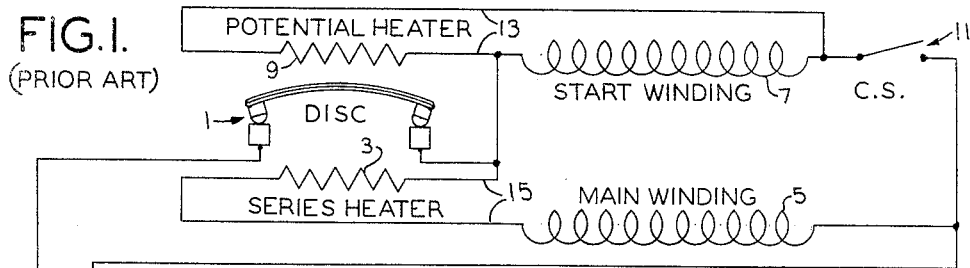
Figure 2:
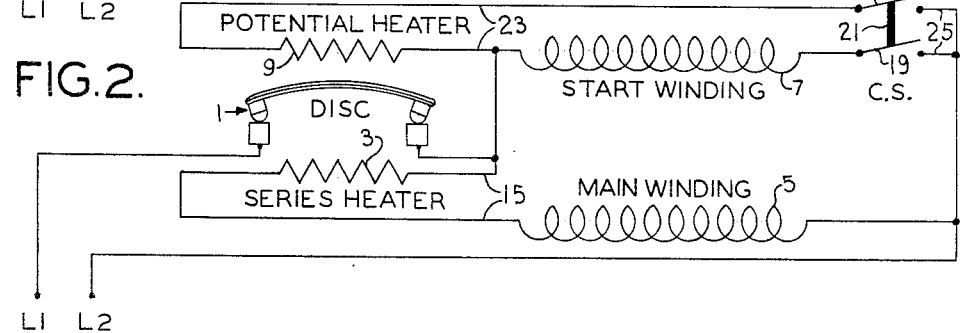
FIG. 2 is a circuit diagram showing one form of the invention applicable to the prior-art circuit of FIG. 1.

In FIG. 1 is shown an old form of protective circuit for an A.C. motor in which the difficulty arises which the form of the invention shown in FIG. 2 corrects. In both of these figures, L1 and L2 indicate an A.C. power line in which is the usual current source and main switch (not shown). Numeral 1 designates a thermostatic switch connected into one side L1 of the power line. This switch may, for example, be of the bimetallic disc type. The switch 1 conducts current from side L1 of the power line to the other side L2 over two paths, one of which consists of a heater 3 connected in series with a first or main motor winding 5, sometimes called a run winding. Thus the switch 1, heater 3 and the main winding 5 are connected in series across the line L1, L2. Heater 3 is of the so-called series type because it is not connected directly across the line L1, L2. Heater 3 is in heat-exchange relationship with the thermostatic disc of switch 1. The other path consist of the motor start winding 7 and a heater 9, which are connected in parallel by a loop 13, and a single-pole, single-throw, motor-speed-responsive centrifugal control switch 11. Thus the thermostatic switch 1, loop 13 and the centrifugal switch 11 are also connected serially across the line L1, L2. The heater 9, being subject to line voltage, is known as a potential heater. It is also in heat-exchange relationship with the thermostatic disc of switch 1.

It has been noted that with some conditions, a circuit such as shown in FIG. 1 has a defect, the cause of which was obscure because of its sporadic appearance in motors. When the motor containing the windings 5 and 7 is at rest, the centrifugal switch 11 is closed. After the circuit L1, L2 is closed, the motor starts with both windings 5 and 7 excited. During acceleration the potential heater 9 functions to protect the start winding 7, should the start winding switch 11 for any reason remain closed for too long a period. Assuming the switch 11 to be operating correctly, when the motor speed reaches a certain value, the switch 11 opens. Then the motor runs on its main winding 5, this winding being protected by the functions of the series heater 3, should a condition occur such as an overload, locked rotor or the like. By the function of either of the heaters 3 or 9 is meant that under conditions in which protective action is required it heats the disc of the thermostatic switch 1 to aid in causing the latter to disconnect the circuit L1, L2.

The defect above referred to is that when the centrifugal switch 11 opens (FIG. 1) there exists the loop circuit 13 connecting the start winding 7 and the potential heater 9. The switch 1, series heater 3 and main winding 5 complete another loop circuit including line L1, L2. This other loop circuit is designated 15. Since the circuits 13 and 15 are in close relationship and circuit 15 carries A.C., an inductive transformer action occurs between circuit 15 acting as a primary loop and circuit 13 acting as a secondary loop. This induces a flow of current through the loop 13. Under certain conditions, sufficient current may flow in the loop circuit 13 to cause the heater 9 to trip open the thermostatic switch 1 and open the primary loop circuit 15. This takes the motor off the line, although conditions of load and speed are not such as to call for such action. Inasmuch as this undesirable effect has heretofore occurred sporadically, depending for one thing upon circuit configuration, its cause has been difficult to ascertain. I have also found that such undesirable effects may occur regardless of whether the thermostatic switch 1 and heater 3 are connected in the loop circuit 15 or in a pilot or other circuit for controlling the motor circuit.

In FIG. 2 is shown one form of the invention to correct the above-mentioned difficulty. In this figure, like numerals designate like parts and require no further description. In this case, instead of employing the single-pole, single-throw switch such as 11, I employ, for example, a double-pole, single-throw centrifugal switch 17, the poles 19 of which are insulated from one another, as indicated at 21. The double-pole arrangement is such that each pole forms a part of the secondary loop circuit 23 and engages and disengages two terminals 25 in the supply circuit. Such a switch has the property that when closed it places the start winding 7 and potential heater 9 in parallel in the loop circuit 23, this circuit being completed by the poles 19 and terminals 25 in the supply circuit. Thus when the switch 17 opens by centrifugal action, the loop form of this circuit 23 disappears and any inductive transformer action from the primary loop circuit 15 also disappears. Therefore, the potential heater 9 under proper running conditions of the motor (switch 17 open) cannot be heated and switch 1 will not be subject to unnecessary opening action.

Figure 3:
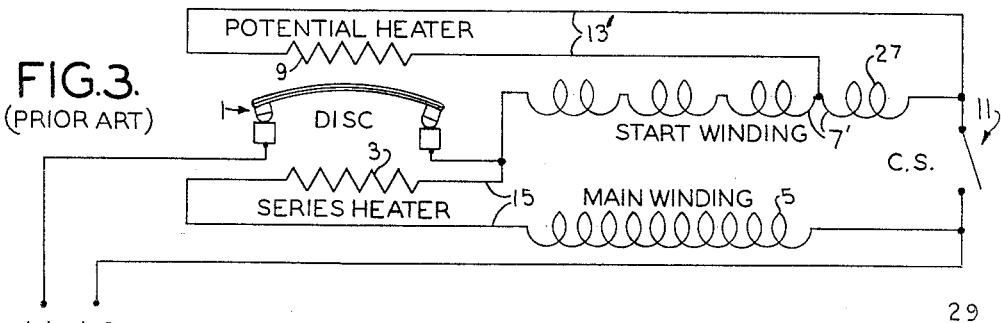
FIG. 3 is a circuit diagram illustrating another form of prior circuit upon which the circuit of the invention is an improvement.
Figure 4:
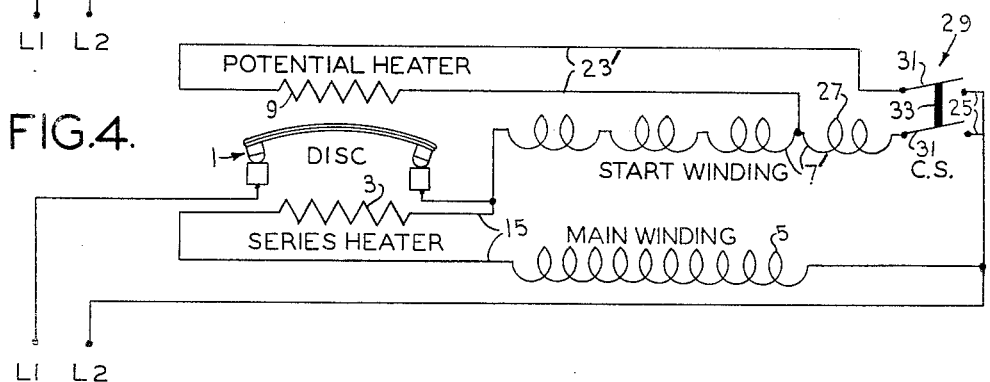
FIG. 4 is a circuit diagram showing another form of the invention applicable to the prior-art circuit shown in FIG. 3.

In FIG. 4 is shown another form of the invention which is an improvement upon a former set of connections such as shown in FIG. 3. In FIG. 3, like numerals designate like parts, referring to FIG. 1. In FIG. 3, however, the secondary loop circuit is designated 13' (instead of 13) because it is connected in a manner to include merely a section or bundle 27 of what is in this case designated as the start winding 7'. This arrangement produces the same kind of inductive transformer action between the primary loop circuit 15 and secondary loop circuit 13', such as above described in connection with FIG. 1. The only difference is that the secondary loop circuit 13', instead of including all of the start winding, includes only a portion or bundle 27 thereof.

In FIG. 4 is shown the application of my invention to correcting the difficulties which occur in connection with the FIG. 3 circuit. In this FIG. 4, like numerals designate parts like those shown in FIG. 3. In this case a double-pole, single-throw switch 29 is again employed. It has conductive poles 31, insulated from one another as shown at 33. This switch is so connected that, when closed, a loop circuit 23' is formed by the potential heater 9, bundle 27, poles 31 and conductors 25. The operation of FIG. 4 will be clear from the operation above given for FIG. 2, noting that the switch 29 opens the secondary loop circuit 23' after the motor has attained running speed, so that the potential heater 9 cannot have its temperature raised by any currents caused inductively by flow of A.C. in the primary loop 15.

In view of the above, it will be seen that the invention consists broadly in so arranging the starting switch, and the circuit including the start winding and potential heater, that this latter circuit will constitute a closed loop only only when the starting switch is closed and not when the motor is running under normal conditions of load and speed.

It will be understood that other equivalent start winding switching arrangements may be substituted for those shown in FIGS. 2 and 4, although those are preferred for simplicity. Thus, for example, single-pole centrifugal switches such as shown at 11 in FIGS. 1 and 3 may be made to open the loops 13 or 13' through more complex relay arrangements, the expense of which might be warranted for larger motors. Such equivalent relay arrangements are known in the art.

It will be apparent that while the series heater 3 will almost invariably be employed in series with the main winding 5, its incorporation is not absolutely necessary to the invention. With or without this series heater 3, the primary loop circuit 15 will constitute a source of transformer action which heretofore has caused the difficulty and which the invention avoids.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A circuit comprising a first winding, a thermostatic switch forming when closed a first series circuit connection with said first winding across a pulsating supply circuit, thereby forming a primary loop circuit when said supply circuit is closed, a control switch operable between an open position and a closed position and having a first part and a second part, a second winding in inductive relation to said primary loop circuit, a heater in heat-exchange relationship with said thermostatic switch, circuitry including said first part of said control switch connecting said heater in parallel with at least a portion of said second winding when said control switch is in closed position, and circuitry including said second part of said control switch connecting said second winding across said supply circuit through said thermostatic switch when said control switch is in closed position, means for operating said switch parts together, whereby the loop formed by the parallel connection of said heater with said second winding is opened when said second winding is disconnected from said supply circuit by said control switch.

2. A circuit according to claim 1, including another heater in heat-exchange relationship with said thermostatic switch and connected to form a series connection with said first winding and thermostatic switch across said supply circuit.

3. An A.C. motor protective circuit comprising a main motor winding, a series heater, a thermostatic switch in heat-exchange relationship with said series heater and forming when closed a first series circuit connection with said series heater and main winding across an A.C. supply circuit, thereby forming a primary loop circuit when said supply circuit is closed, a centrifugal start winding switch operable between an open position and a closed position and having a first part and a second part, a start winding, a second heater in heat-exchange relationship with said thermostatic switch, circuitry including said first part of said start switch connecting said second heater in parallel with all of said start winding when said start switch is in closed position, and circuitry including said second part of said start switch connecting said start winding across said supply circuit through said thermostatic switch when said start switch is in closed position, means for operating said start switch parts together, whereby the loop formed by the parallel connection of said second heater with said start winding is opened when said start winding is disconnected from said supply circuit by said start switch.

4. An A.C. motor protective circuit comprising a main motor winding, a series heater, a thermostatic switch in heat-exchange relationship with said series heater and forming when closed a first series circuit connection with said series heater and main winding across an A.C. supply circuit, thereby forming a primary loop circuit when said supply circuit is closed, a start winding switch operable between an open position and a closed position and having a first part and a second part, a start winding, a second heater in heat-exchange relationship with said thermostatic switch, circuitry including said first part of said start switch connecting said second heater in parallel with a portion only of said start winding when said start switch is in closed position, and circuitry includng said second part of said start switch connecting said start winding across said supply circuit through said thermostatic switch when said start switch is in closed position, means for operating said start switch parts together, whereby the loop formed by the parallel connection of said second heater with said start winding is opened when said start winding is disconnected from said supply circuit by said start switch.

5. A circuit comprising a first winding connected across a pulsating supply circuit, thereby forming a primary loop circuit when said supply circuit is closed, thermostatic switch means operatively connected for protecting said first winding, a control switch operable between an open position and a closed position and having a first part and a second part, a second winding in inductive relation to said primary loop circuit, a heater in heat-exchange relationship with said thermostatic switch means, circuitry including said first part of said control switch connecting said heater in parallel with at least a portion of said second winding when said control switch is in closed position, and circuitry including said second part of said control switch connecting said second winding across said supply circuit through said thermostatic switch when said control switch is in closed position, means for operating said switch parts together, whereby the loop formed by the parallel connection of said heater with said second winding is opened when said second winding is disconnected from said supply circuit by said control switch.

References Cited in the file of this patent
UNITED STATES PATENTS
1,997,673    Boothby _____ Apr. 16, 1935